Jan. 10, 1961     S. M. STOODY     2,967,510
CATTLE TABLE
Filed May 25, 1959     3 Sheets-Sheet 3
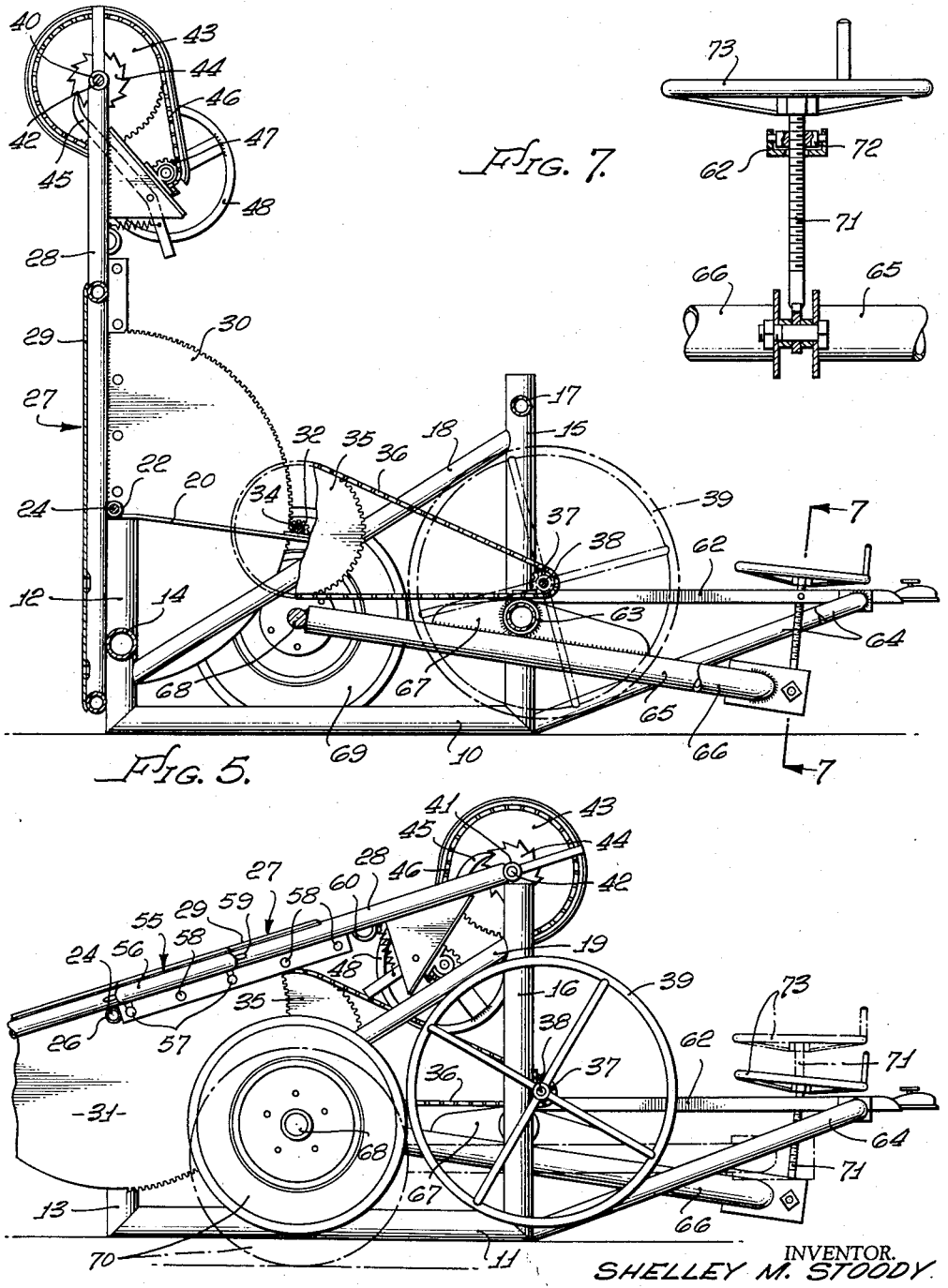
INVENTOR.
SHELLEY M. STOODY
BY Hazard & Miller
ATTORNEYS.

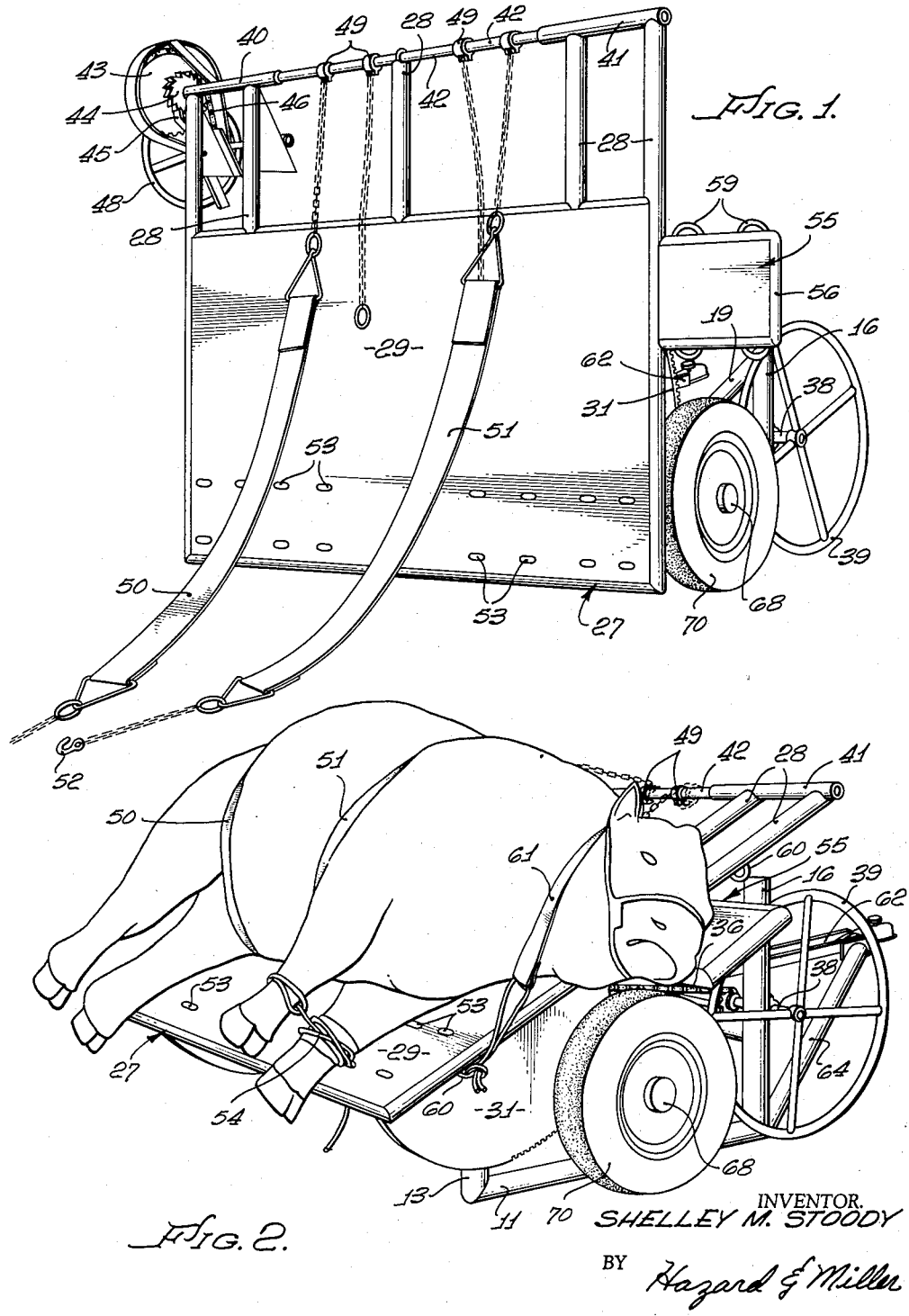

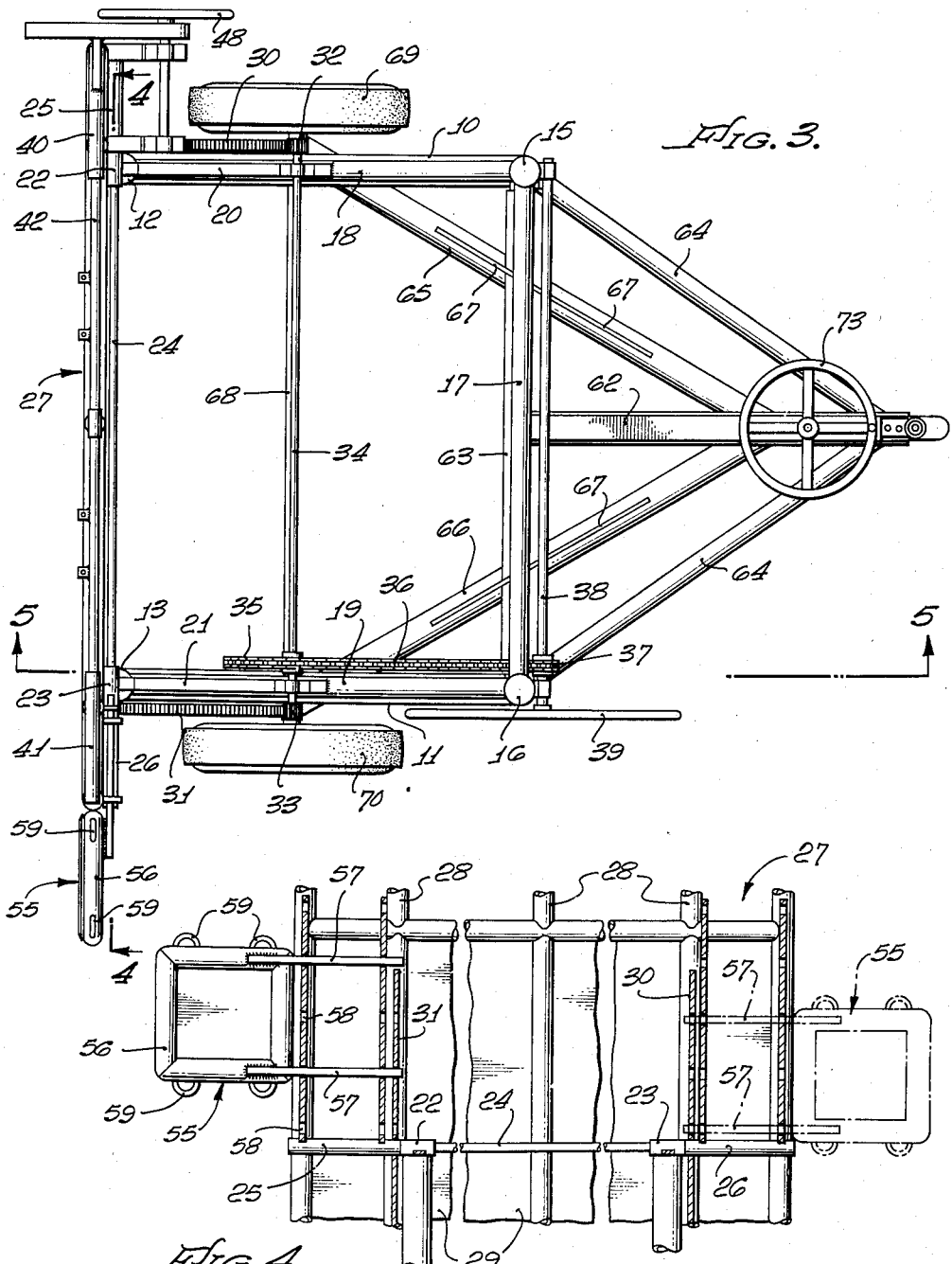

United States Patent Office 2,967,510
Patented Jan. 10, 1961

2,967,510

CATTLE TABLE

Shelley M. Stoody, Rte. 3, Box 91, Chino, Calif.

Filed May 25, 1959, Ser. No. 815,455

2 Claims. (Cl. 119—103)

This invention relates to improvements in cattle tables.

Explanatory of the present invention, in the care of livestock it is frequently desirable to position an animal on its side on a table to enable various operations to be performed thereon. For example, a bull periodically should have its hooves cared for and trimmed. Various other operations may be performed on the bull and for this reason, it is desirable to have a portable device having a tiltable table against which the bull or other animal may be positioned while the table is in a vertical position. The animal may then be attached to the table, and while thus attached the table can be tilted into a position approaching the horizontal.

An object of the present invention is to provide an improved cattle table of this general character which is of relatively simple construction and which will facilitate the lashing of an animal to the table while in a vertical position and which will enable the table with the animal lashed thereto to be tilted into the desired position.

More specifically, an object of the invention is to provide a cattle table consisting essentially of a frame having ground sills with forward and rear uprights mounted thereon. The forward uprights serve to tiltably support the table so that it may be turned into or from a vertical position. The rear uprights serve to pivotally support levers on the forward ends of which ground wheels are rotatably mounted. The frame structure has a drawbar attached thereto by which the cattle table may be towed from place to place, and a means is provided for raising and lowering the rear ends of the levers relatively to the drawbar so that the entire structure can be completely supported in an approximately balanced condition on the ground wheels while being transported and on reaching the desired location the frame structure can be lowered and deposited on the ground in such a manner that the weight of the animal on the table will not involve a tipping of the entire structure.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the cattle table embodying the present invention, the table being shown in upright or vertical position;

Fig. 2 is a perspective view of the same, but illustrating the table as having an animal attached thereto and tilted into a position approaching the horizontal;

Fig. 3 is a top plan view of the cattle table;

Fig. 4 is a partial view taken substantially upon the line 4—4 upon Fig. 3 in the direction indicated;

Fig. 5 is a view taken substantially upon the line 5—5 upon Fig. 3 in the direction indicated;

Fig. 6 is a partial view in side elevation illustrating the table in its tilted condition and illustrating in phantom lines the position assumed by the parts when the table is in condition for transport; and Fig. 7 is a partial view in vertical section taken substantially upon the line 7—7 upon Fig. 5.

Referring to the accompanying drawings wherein similar reference characters designate similar parts throughout, the improved cattle table comprises a frame consisting essentially of a pair of longitudinally extending, approximately parallel ground sills 10 and 11. These ground sills have adjacent their forward ends uprights 12 and 13 which may be connected to each other such as by a crossbar 14.

At the rear ends of the ground sills there are uprights 15 and 16 which may also be connected to each other by a crossbar 17. Diagonal braces 18 and 19 connect the upper ends of the rear uprights 15 and 16 with the forward uprights 12 and 13 and additional braces 20 and 21 preferably connect the upper ends of the forward uprights 12 and 13 with the diagonal braces 18 and 19.

The above-described structure constitutes a rigid frame which can be positioned solidly on the ground, resting on the ground sills 10 and 11 or elevated therefrom so that it may be transported from place to place as hereinafter described.

The tops of the forward uprights 12 and 13 have rigidly mounted thereon journals 22 and 23 that serve to rotatably support a shaft 24 extending therethrough. On the outer ends of this shaft there are sleeves 25 and 26 on which the structure forming the table generally indicated at 27, is mounted whereby the table can be tilted relative to the frame structure. The table proper is preferably formed of a framework composed of welded sections of tubing 28 against the forward side of which there is rigidly secured either metal plate 29 or heavy gauge sheet metal.

Near each side of the table segmental gears 30 and 31 are rigidly secured, these segmental gears being preferably secured to elements 28 of the table frame so as to be rigid therewith. These segmental gears are preferably semicircular in form and materially contribute to the strength and stiffness of the entire table. The teeth of these segmental gears mesh with pinions 32 and 33 that are on a transverse shaft 34 that is rotatably mounted in bearings on the braces 20 and 21. The shaft 34 also has thereon a sprocket 35 over which is trained an endless chain 36 that is also trained over a small sprocket 37 mounted on a shaft 38 that is rotatably supported on the rear uprights 15 and 16. The shaft 38 can be manually rotated by a handwheel 39. It will be appreciated that on rotation of the handwheel 39 that the pinions 32 and 33 will be rotated with considerable mechanical advantage and will slowly rotate the table 27 about shaft 24 as a center from the vertical position shown in Fig. 5, into an inclined position approaching the horizontal shown in Fig. 6. If the handwheel is rotated in the reverse direction the table 27 will be shifted from the position shown in Fig. 6 back into the position shown in Fig. 5.

Some of the table frame elements 28 are extended upwardly and serve to support bearings 40 and 41 for a rotatable shaft 42. This shaft at one end thereof is equipped with a sprocket 43 and a ratchet wheel 44 which is engageable by a spring actuated pawl 45. An endless chain 46 is trained over the sprocket 43 and over a smaller sprocket 47 that can be rotated by a handwheel 48.

On the shaft 42 there are collars 49 which are rigidly fastened to the shaft. These collars serve to attach ends of chain lengths to the shaft 42 so that these chain lengths can be wound thereon. The chains are adapted to have connected thereto the ends of bellybands or straps 50 and 51, one end of each bellyband being preferably permanently attached to its chain length and the other end of each bellyband being detachably connected to the adjacent chain length such as by hooks 52.

In the table top 29 adjacent the bottom thereof there are preferably a series of apertures 53 through which hobbles or lashings 54 can be drawn and tightened. A headrest 55 is provided which is applicable to either side edge of the table 27. This headrest consists of a suitable frame 56 carrying parallel arms 57 which are receivable selectively in any of a series of apertures 58 in flanges on the back of the table so that the headrest 55 can be adjusted as to height. The arms 57 may extend into apertures in the segmental gears 30 and 31.

The headrest may be equipped with loops 59 at the top and bottom thereof and additional loops 60 may be provided on the side edges of the table proper for the application of a neckband 61 or a halter (not shown).

In applying an animal to the table 27 the table is positioned in its vertical position as shown in Fig. 1. The animal is led to a position parallel to the table and the bellybands 50 and 51 are swung beneath the animal and connected to the chain lengths. The shaft 42 is then rotated by means of the handwheel 48 so as to lift a substantial portion of the weight of the animal by means of the bellybands. The intention is not to lift the animal clear of the ground but to merely cause the major portion of its weight to be taken by the bellybands 50 and 51. The headrest 55 can then be positioned opposite the head of the animal and the neckband 61 lashed to the table. If the animal is equipped with a halter the halter may be lashed to the headrest by means of the loops 59 on the headrest. With the animal thus lashed to the table the handwheel 49 can then be rotated which produces a positive tilting of the table 27 relative to the frame structure. The gear reduction between the handwheel 39 and the segmental gears 30 and 31 is such that tilting of the table can be accomplished with great mechanical advantage. Furthermore, if the handwheel 39 is released in any adjusted position the mechanical advantage is so great that the table with the animal thereon will ordinarily remain in adjusted position. When the table has been tilted the operations required can be readily performed on the animal after which the table can be returned to its vertical position and the animal released.

To facilitate the transportation of the cattle table a drawbar 62 is rigidly connected to the transverse tubing 63 that connects the rear uprights 15 and 16. This drawbar may be braced by diagonal braces 64. Levers 65 and 66 extend diagonally beneath the tubing 63 and have gusset plates 67 welded thereto which are pivotally mounted on the tubing 63. These levers which diverge forwardly have an axle 68 mounted on their forward ends on which ground wheels 69 and 70 are rotatably mounted. The ground wheels are consequently positioned about midway between the forward uprights 12 and 13 and the rear uprights 15 and 16. The joined forward ends of the levers have pivotally mounted thereon a jackscrew 71 which extends through a gimbaled collar 72 on the drawbar and which has threaded thereon a handwheel 73. By rotating the handwheel 73 the rear ends of the levers 65 and 66 can be drawn upwardly toward the drawbar, thus swinging the ground wheels 69 and 70 downwardly into engagement with the ground and consequently lifting the entire frame structure and table into an elevated or transporting position as shown in dotted lines on Fig. 6. While in this position the drawbar can be attached to a towing vehicle and the cattle table readily transported from place to place. When the cattle table has reached the desired location, reverse rotation of the handwheel 73 depresses the rear ends of the levers 65 and 66 lifting the ground wheels 69 and 70 and thus positioning the frame structure solidly on the ground on its sills 10 and 11.

It will be appreciated from the above-described construction that an improved cattle table is provided which is of extremely sturdy design and which can be readily transported from place to place and at the selected location it can be easily operated to tilt even an extremely heavy animal into the desired prone position.

Various changes may be made in the details of construction without departing from the spirit and scope of the invention as defined by the appended claims.

I claim:

1. A cattle table comprising a frame, a table tiltably mounted on the frame adjacent one end thereof, means on the top of the table when in vertical position for lifting some of the weight of an animal, means on the frame for tilting the table, a towing drawbar on the opposite end of the frame from the table, a ground wheel frame tiltably mounted on the mentioned frame, ground wheels rotatably mounted upon the ground wheel frame, located outwardly of the sides of the first-mentioned frame, and means for moving the ground wheel frame relatively to the drawbar to optionally depress the ground wheels and cause the first-mentioned frame to be supported thereby and to elevate the ground wheels and allow the first-mentioned frame to be supported directly by the ground.

2. A cattle table comprising sills, forward and rear uprights adjacent the ends of the sills, a table tiltably mounted on the forward uprights, means for tilting the table relatively thereto, a drawbar rigidly connected to the sills and rear uprights, levers pivotally supported on the rear uprights located between the forward and rear uprights and outwardly of the sills, ground wheels on the forward ends of the levers, and means for raising and lowering the rear ends of the levers relative to the drawbar to lower and raise the ground wheels.

References Cited in the file of this patent

UNITED STATES PATENTS

| | | |
|---|---|---|
| 834,509 | Cozier | Oct. 20, 1906 |
| 1,357,416 | Olinger | Nov. 2, 1920 |
| 2,703,554 | Haggard et al. | Mar. 8, 1955 |

FOREIGN PATENTS

| | | |
|---|---|---|
| 252,869 | Italy | Apr. 19, 1927 |